United States Patent
Romm et al.

(10) Patent No.: US 8,533,705 B2
(45) Date of Patent: *Sep. 10, 2013

(54) REGISTRY EMULATION

(75) Inventors: Amnon Romm, Thornhill (CA); Avi Elkoni, Matan (IL)

(73) Assignee: Extent Technologies, Ltd., Petach Tikva (IL)

( * ) Notice: Subject to any disclaimer, the term of this patent is extended or adjusted under 35 U.S.C. 154(b) by 948 days.

This patent is subject to a terminal disclaimer.

(21) Appl. No.: 12/581,671

(22) Filed: Oct. 19, 2009

(65) Prior Publication Data

US 2010/0037218 A1    Feb. 11, 2010

Related U.S. Application Data

(63) Continuation of application No. 11/177,305, filed on Jul. 11, 2005, now Pat. No. 7,607,127, which is a continuation of application No. 10/645,902, filed on Aug. 22, 2003, now abandoned, which is a continuation of application No. 09/528,582, filed on Mar. 20, 2000, now Pat. No. 6,779,179.

(60) Provisional application No. 60/188,155, filed on Mar. 9, 2000.

(51) Int. Cl.
*G06F 9/445* (2006.01)
*G06F 9/44* (2006.01)

(52) U.S. Cl.
USPC .......................................... 717/175; 717/170

(58) Field of Classification Search
None
See application file for complete search history.

(56) References Cited

U.S. PATENT DOCUMENTS

| | | | |
|---|---|---|---|
| 5,581,768 A | 12/1996 | Garney et al. | |
| 5,684,996 A | 11/1997 | Westerholm et al. | |
| 5,754,817 A | 5/1998 | Wells et al. | |
| 5,787,493 A | 7/1998 | Niijma et al. | |
| 5,790,809 A | 8/1998 | Holmes | |
| 5,822,784 A | 10/1998 | Garney | |
| 5,832,511 A * | 11/1998 | Beck et al. ............................ | 1/1 |
| 5,970,252 A | 10/1999 | Buxton et al. | |
| 5,980,078 A | 11/1999 | Krivoshein et al. | |
| 6,112,324 A | 8/2000 | Howe et al. | |
| 6,189,139 B1 | 2/2001 | Ladd | |
| 6,347,398 B1 | 2/2002 | Parthasarathy et al. | |
| 6,374,402 B1 | 4/2002 | Schmeidler et al. | |

(Continued)

OTHER PUBLICATIONS

Russinovich et al., "Monitoring Registry Activity During the Boot Process," Sysinternals Freeware—Information for Windows NT and Windows 2000—Inside I/O Completion Parts, http://www.sysinternals.com/ntw2klinfo/regboot.shtml, pp. 1-4 (Nov. 2, 1998).

(Continued)

*Primary Examiner* — Jason Mitchell
(74) *Attorney, Agent, or Firm* — Sterne, Kessler, Goldstein & Fox P.L.L.C.

(57) ABSTRACT

A method for running a software application on a computer having an operating system that provides a local database containing consistent configuration data to be accessed by programs running on the computer. The method includes providing a file containing further configuration data required by the application, which further data are not stored in the local database. A request by the application to access the local database is intercepted, and an item of the further configuration data is returned from the file to the application, responsive to the request.

8 Claims, 6 Drawing Sheets

(56) References Cited

U.S. PATENT DOCUMENTS

| | | | |
|---|---|---|---|
| 6,418,554 B1 | 7/2002 | Delo et al. | |
| 6,453,334 B1 | 9/2002 | Vinson et al. | |
| 6,751,658 B1* | 6/2004 | Haun et al. .................... | 709/222 |
| 6,779,179 B1 | 8/2004 | Romm et al. | |
| 2002/0066085 A1* | 5/2002 | Nowlin, Jr. et al. ........... | 717/137 |

OTHER PUBLICATIONS

Russinovich, "Improve Performance and Explore Internal Structure," Inside NT Utilities, http://www.win2000mag.com/Articles/Index.cfm?ArticleID+4795&pg=1, pp. 1-3 (Feb. 1999).

Russinovich, "Inside NT Utilities," http://www.win2000mag.com/Articles/Index.cfm?ArticleID=4795&pg=2, pp. 1-3 (Feb. 1999).

Russinovich, "Regman," Inside NT Utilities, http://www.win2000mag.com/Articles/Index.cfm?ArticleID=4795&pg=3, pp. 1-3 (Feb. 1999).

Russinovich, "HandleEx," Inside NT Utilities, http://www.win2000mag.com/Articies/Index.cfm?ArticleID=4795&pg=4, pp. 1-3 (Feb. 1999).

Russinovich, "NTFSDOS," Inside NT Utilities, http://www.win2000mag.com/Articles/Index.cfm?ArticleID=4795&pg=5, pp. 1-3 (Feb. 1999).

Roberts et al., "DDJ May 1996—Operating Systems," May 1996—Operating Systems, http://www.ddj.com/articles/1996/9605. pp. 1-4 (May 1996).

Russinovich et al., "Examining VxD Service Hooking," May96: Examining VxD Service Hooking, Dr. Dobbs Journal, pp. 1-9 (May 1996).

Woehr et al., "DDJ Jan. 1997—Encryption, Error Correction & Compression," 9701, http://www.ddj.com/articles/1997/9701, pp. 1-5 (Jan. 1997).

Russinovich et al., "NTRegmon Uses Hooking to Show Detailed Information About Every Registry Access," Dr. Dobb's Journal Jan. 1997: Windows NT System-Call Hooking, Dr. Dobbs Journal, pp. 1-8 (Jan. 1997).

Russinovich et al., "Regmon for Windows NT/9x," Sysinternals Freeware—Information for Windows NT and Windows 2000—Regmon, http://www.sysinternals.com/ntw2k/info/regmon.shtml. pp. 1-5 (Nov. 7, 2000) (V. 4.32) (Copyright 1996).

Chen et al., "Emulating Windows Registry in Unix," BYTE Magazine, http://www.byte.com/documents/s=22/byt19990729s0001/index.htm, pp. 1-2 (Jul. 29, 1999).

Chen et al., "Three Registry Emulation Solutions," BYTE Magazine, http://www.byte.com/documents/s=22/byt19990729s0001/index2.htm. pp. 1-2 (Jul. 29, 1999).

Chen et al., "Multi-Directories Single-File Solution," BYTE Magazine, http://www.byte.com/documents/s=22/byt19990729s0001/index3.htm, pp. 1-2 (Jul. 29, 1999).

Chen et al., "Multi-Directories Multi-Files Solution," BYTE Magazine, http://www.byte.com/documents/s=22/byt19990729s0001/index4.htm. pp. 1-2 (Jul. 29, 1999).

Chen et al ., "Security Considerations of Registry Emulation," BYTE Magazine, http://www.byte.com/documents/s=22/byt19990729s0001/index5.htm, pp. 1-2 (Jul. 29, 1999).

"Wine Development HQ," Wine Development HQ—About, http://www.winehq.com/about.shtml, pp. 1-4 (printed Jan. 25, 2002).

"Corel's Contributions to the Wine Project," Linux Today—Corel's Contribution to the Wine Project, http://linuxtoday.com/news story.php3?1tsn=1999-06-23-05-NW-SM, pp. 1-9 (Jun. 23, 1999).

"About Wine," The Wine Knowledgebase: About Wine, http://wine.codeweavers.com/fommeta/cache/3.html, 1 page, (1999-2001).

"What is Wine," The Wine Knowledgebase: What is Wine, http://wine.codeweavers.com/fommeta/cache/18.html, 1 page, (1999-2001).

"Is Wine an Emulator," The Wine Knowledgebase: Is Wine an Emulator, http://wine.codeweavers.com/fom-meta/cache/27.html, 1 page, (1999-2001).

"It Calls Native Libraries . . . . not an Emulated Environment," The Wine Knowledgebase: It calls Native libraries . . . . not an Emulated Environment, http://wine.codeweavers.com/fommeta/cache/325.html, 1 page, (1999-2001).

Anonymous. "Device and Method for Monitoring Computer," Research Disclosure, vol. 42, No. 421, May 1,1999,1 page.

Vogels et al. "The design and architecture of the Microsoft Cluster Service-a practical approach to high-availability and scalability," IEEE Comput. Soc., Jun. 23-25,1998, pp. 422-431.

Catron et al. "Generic manufacturing controllers," IEEE Comput. Soc., Aug. 24, 1988, pp. 742-744.

Patent Cooperation Treaty, International Search Report, International Application No. PCT/US 01/07397, mailed on Jun. 28, 2002, 8 pages.

* cited by examiner

REGISTRY EMULATION

CROSS REFERENCE TO RELATED APPLICATIONS

This application is a continuation of U.S. patent application Ser. No. 11/177,305, filed Jul. 11, 2005, which will issue as U.S. Pat. No. 7,607,127 on Oct. 20, 2009, which is a continuation of U.S. patent application Ser. No. 10/645,902, filed Aug. 22, 2003, now abandoned, which is a continuation of U.S. patent application Ser. No. 09/528,582, filed Mar. 20, 2000, now U.S. Pat. No. 6,779,179, which claims the benefit of a U.S. Provisional Patent Application No. 60/188,155 filed Mar. 9, 2000, which is assigned to the assignee of the present patent application, each of which is incorporated herein by reference.

BACKGROUND OF THE INVENTION

1. Field of the Invention

The present invention relates generally to computer application software, and specifically to methods and system enabling application software to run on a computer without installation.

2. Background Art

The registry is a system-defined database, which is included as a part of Microsoft Windows 3.1 and later Windows operating systems. It is used by applications and other system components to store and retrieve consistent configuration data. Information regarding the registry and its use is provided in publications available from the Microsoft Developers' Network (MSDN) of Microsoft Corporation, Redmond, Wash., including "Platform SDK: Performance Monitoring/Registry," and Chapter 23 (Registry) of the "Driver Development Kit." These publications are incorporated herein by reference. Data in the registry can be manipulated using application program interface (API) functions and services described in the above-mentioned publication, as well as with a Windows utility called the Registry Editor (Regedit.exe). Registry-related services are normally carried out by the Virtual Machine Manager (Viii) component of the Windows operating system kernel.

The registry stores data in a hierarchically-structured tree. Each node in the tree is called a key. Each key can contain both subkeys (which are themselves keys) and data entries called values. When an application is installed on a computer running Windows, it typically stores its own registry data in a branch under a key that is created for the particular application. In addition, the application may also use subkeys and values that are stored under other keys, which are shared with the operating system and/or with other applications. While the application is running, it uses the names of the appropriate keys to navigate in the registry for the purpose of reading and writing configuration data. Without the configuration data, the application is unable to run. For this reason, installation is an indispensable preparatory step to running most Windows applications that are known in the art.

During the installation procedure, the application creates any necessary new keys and writes the values that it will require in the registry. To add a new key or value to the registry, the application must first open an existing key, typically using the RegOpenKeyEx function (or a corresponding service RegOpenKey), as described in the above-mentioned documentation. After creating a new subkey or setting a new value, the key is closed, and the new data are written to the registry. A group of keys, subkeys and values belonging to a specified branch of the registry may be saved to a backup file, known as a hive file, using the RegSaveKey function, as described in the above-mentioned MSDN documentation. Subsequently, the RegLoadKey function can be used to recall the information from the hive file and to restore it to the registry in a specified location. When the hive file contains data used by an application, it must be loaded back into the registry before the application can run.

BRIEF SUMMARY OF THE INVENTION

It is an object of some aspects of the present invention to provide methods for enabling a software application to run on a computer without installation.

It is a further object of some aspects of the present invention to provide tools for emulating functions of the Windows registry.

In preferred embodiments of the present invention, a computer running a Windows operating system, and thus having a local registry, initiates running of a software application without installing on the computer. Instead, registry information needed for the application is provided in a previously-created emulation hive file. The data in the hive file are loaded into the local registry at a predetermined location before the application begins to run. When the application attempts to access the registry, by invoking an appropriate key as specified by the application designer, a registry emulation function intercepts the application's request. The emulation function determines whether the key is located in the local registry or is taken from the data in the emulation hive file. Based on this determination, the emulation function services the request. The registry emulation is transparent to the application and to the operating system, so that the application runs as though it was actually installed on the computer.

In some preferred embodiments of the present invention, the application software and hive file are stored on a server, which is accessed by the computer via a network, such as the Internet. The registry emulation feature enables the computer to run the application without a user of the computer having to spend the time and effort required to download and install the entire application. Typically, only the hive file and required portions of the application are downloaded. Preferably, configuration changes made by the user while the application is running are saved in the emulation hive file when the computer exits from the application. The next time the user accesses this application, the hive file enables the saved configuration to be restored immediately. The local registry on the computer is substantially unaffected, however.

In some preferred embodiments of the present invention, the emulation hive file is created by actually installing the application on a trial computer, and intercepting requests by the application to write data to the registry during installation. A list is maintained of the keys created or used by the application during installation. The keys and their values are preferably arranged in a special branch of the registry of the trial computer that is created for this purpose, which mirrors the actual locations of the keys in the registry as used by the installation process. Upon the conclusion of installation, the special branch is saved, thus creating the emulation hive file.

Although preferred embodiments described herein are based on the registry of the Windows operating system, the principles of the present invention are similarly applicable to other operating systems that use a common database to maintain consistent configuration data for different applications.

There is therefore provided, in accordance with a preferred embodiment of the present invention, a method for running a software application on a computer having an operating system that provides a local database containing consistent configuration data to be accessed by programs running on the computer, the method including:

providing a file containing further configuration data required by the application, which further data are not stored in the local database;

intercepting a request by the application to access the local database; and returning an item of the further configuration data from the file to the application, responsive to the request.

Preferably, the database includes a hierarchical database having a tree structure that includes a plurality of branches, and providing the file includes providing data corresponding to one or more branches of the tree structure that are used by the application. Further preferably, the operating system includes a Windows operating system, and the database includes a Windows registry, and providing the data includes providing one or more registry keys, wherein intercepting the request includes hooking a registry service request. Most preferably, hooking the registry service request Includes identifying one of the keys in the request, and processing the request responsive to the identified key. Further preferably, providing the file includes providing a hive file, and loading the data from the file into the registry before running the application.

Preferably, intercepting the request includes making a determination whether the request relates to one of the branches that contains only the further configuration data, or whether the request relates to another of the branches that is shared with the database, and processing the request responsive to the determination.

Additionally or alternatively, intercepting the request by the application includes receiving a request to alter the further configuration data, and the method includes altering the data in the file responsive to the request. Preferably, the method further includes saving the file including the altered data upon termination of the application, to be used in running the application subsequently.

Preferably, returning the item of the further configuration data includes emulating access by the operating system to the database, so that the request is handled in a manner transparent to the application.

In a preferred embodiment, the further configuration data include data that would normally be written to the database in the course of installation of the application on the computer, and running the software application includes running the application substantially without installation on the computer, by using the data in the file.

There is also provided, in accordance with a preferred embodiment of the present invention, a method for running a software application on a computer without installation of the application thereon, under an operating system that provides a local database containing consistent configuration data to be accessed by programs running on the computer, which configuration data would normally include installation data generated during the installation of the application, the method including;

providing a file containing the installation data, which are not stored in the local database; and accessing the data in the file instead of accessing the local database so as to retrieve the installation data while running the application.

Preferably, the method includes receiving the file and the application by download over a network to run on the computer. Further preferably, accessing the data includes providing the installation data from the file in a manner that emulates access by the operating system to the database, whereby the data are accessed in a manner transparent to the application.

In a preferred embodiment, providing the file includes collecting the installation data responsive to installing the application on a trial computer.

There is additionally provided, in accordance with a preferred embodiment of the present invention, a method for generating an emulation file for use in running a software application on a user computer under an operating system that provides a local database containing consistent configuration data to be accessed by programs running on the user computer, which configuration data would normally include installation data generated during installation of the application on the user computer, the method including:

installing the application on a trial computer;

intercepting a request generated while installing the application to write the installation data to the database on the trial computer; and responsive to the intercepted request, writing the installation data to the emulation file, to be accessed by the application running on the user computer in place of accessing the local database, whereby, the application runs on the user computer without installation thereon.

Preferably, writing the installation data includes saving one or more registry keys in a hive file. Most preferably, saving the one or more registry keys in the hive file includes creating an emulation branch in the registry that mirrors locations at which the one or more keys are stored in the registry during the installation on the trial computer, and saving the emulation branch in the hive file.

There is further provided, in accordance with a preferred embodiment of the present invention, computer apparatus having an operating system that provides a local database containing consistent configuration data to be accessed by programs running on the apparatus, which apparatus is adapted to receive a file containing further configuration data required by an application, which further data are not stored in the local database, and to run an application under the operating system by intercepting requests made by the application to access the database and to return, responsive to the requests, items of the further configuration data from the file to the application.

There is moreover provided, in accordance with a preferred embodiment of the present invention, computer apparatus for running a software application under an operating system that provides a local database containing consistent configuration data to be accessed by programs running on the computer, which configuration data would normally include installation data generated during installation of the application on the apparatus, which apparatus is adapted to receive a file containing the installation data, which are not stored in the local database, and to run the application without the installation of the application on the apparatus by retrieving the installation data from the file instead of accessing the local database.

There is furthermore provided, in accordance with a preferred embodiment of the present invention, apparatus for generating an emulation file for use in running a software application on a user computer under an operating system that provides a local database containing consistent configuration data to be accessed by programs running on the user computer, which configuration data would normally include installation data generated during installation of the application on the computer, the apparatus including a trial computer on which the application is installed, which trial computer is adapted to intercept requests, generated while installing the application, to write the installation data to the local database on the trial computer, and which trial computer is further adapted, responsive to the intercepted requests, to write the installation data to the emulation file, to be accessed by the application running on the user computer in place of accessing the local database, whereby the application runs on the user computer without installation thereon.

There is also provided, in accordance with a preferred embodiment of the present invention, a computer software product for enabling a software application to run on a computer having an operating system that provides a local database containing consistent configuration data to be accessed by programs running on the computer, the product including a computer-readable medium in which program instructions are stored, which instructions, when read by the computer, cause the computer to receive a file containing further configuration data required by the application, which further data are not stored in the local database, and to intercept a request by the application to access the local database, so as to return an item of the further configuration data to the application, responsive to the request.

There is additionally provided, in accordance with a preferred embodiment of the present invention, a computer software product for enabling a software application to run on a computer without installation of the application on the computer, under an operating system that provides a local database containing consistent configuration data to be accessed by programs running on the computer, which configuration data would normally include installation data generated during the installation of the application on the computer, the product including a computer-readable medium in which program instructions are stored, which instructions, when read by the computer, cause the computer to read a file containing the installation data, which installation data are not stored in the database, and to access the data in the file instead of accessing the local database so as to retrieve the installation data while running the application.

There is further provided, in accordance with a preferred embodiment of the present invention, a computer software product for generating an emulation file for use in running a software application on a user computer under an operating system that provides a local database containing consistent configuration data to be accessed by programs running under the, operating system, which configuration data would normally include installation data generated during installation of the application, the product including a computer-readable medium in which program instructions are stored, which instructions, when read by a trial computer, cause the trial computer to intercept a request generated to write the installation data to the database while the application is being installed on the trial computer, and responsive to the intercepted request, to write the installation data to the emulation file, to be accessed by the application running on the user computer instead of accessing the local database, whereby the application runs on the user computer without installation thereon.

The present invention will be more fully understood from the following detailed description of the preferred embodiments thereof, taken together with the drawings in which:

BRIEF DESCRIPTION OF THE DRAWINGS/FIGURES

DETAILED DESCRIPTION OF THE INVENTION

Figure 1:
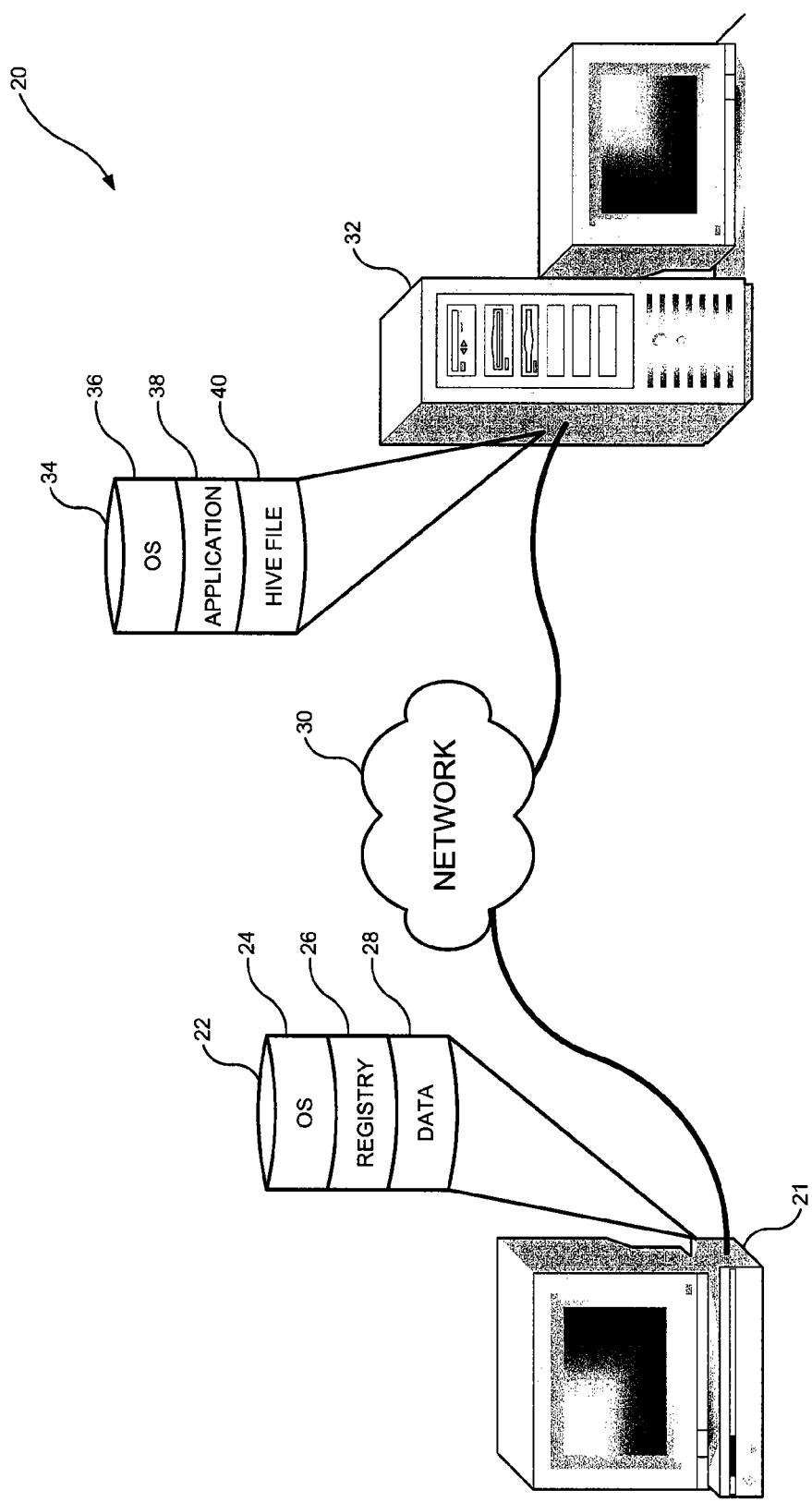
FIG. 1 is a block diagram that schematically illustrates a system for running computer software applications without installation thereof, in accordance with a preferred embodiment of the present invention.

FIG. 1 is a block diagram that schematically illustrates a system 20 for running software applications without installation on a computer 21, in accordance with a preferred embodiment of the present invention. Computer 21 preferably comprises a personal computer (PC) running a Microsoft Windows operating system. The computer has a disk memory 22 which stores operating system files 24 and a local Windows registry 26, as well as other data 28. Computer 21 is linked to a server 32, preferably via a network 30, such as the Internet. A disk memory 34 of the server stores its own operating system files 36, along with an executable application program file 38 and a hive file 40 associated with the application program. The hive file is used to supplement the data in local registry 26, enabling the application to run on computer 21 without installation, as described hereinbelow.

Figure 2A:
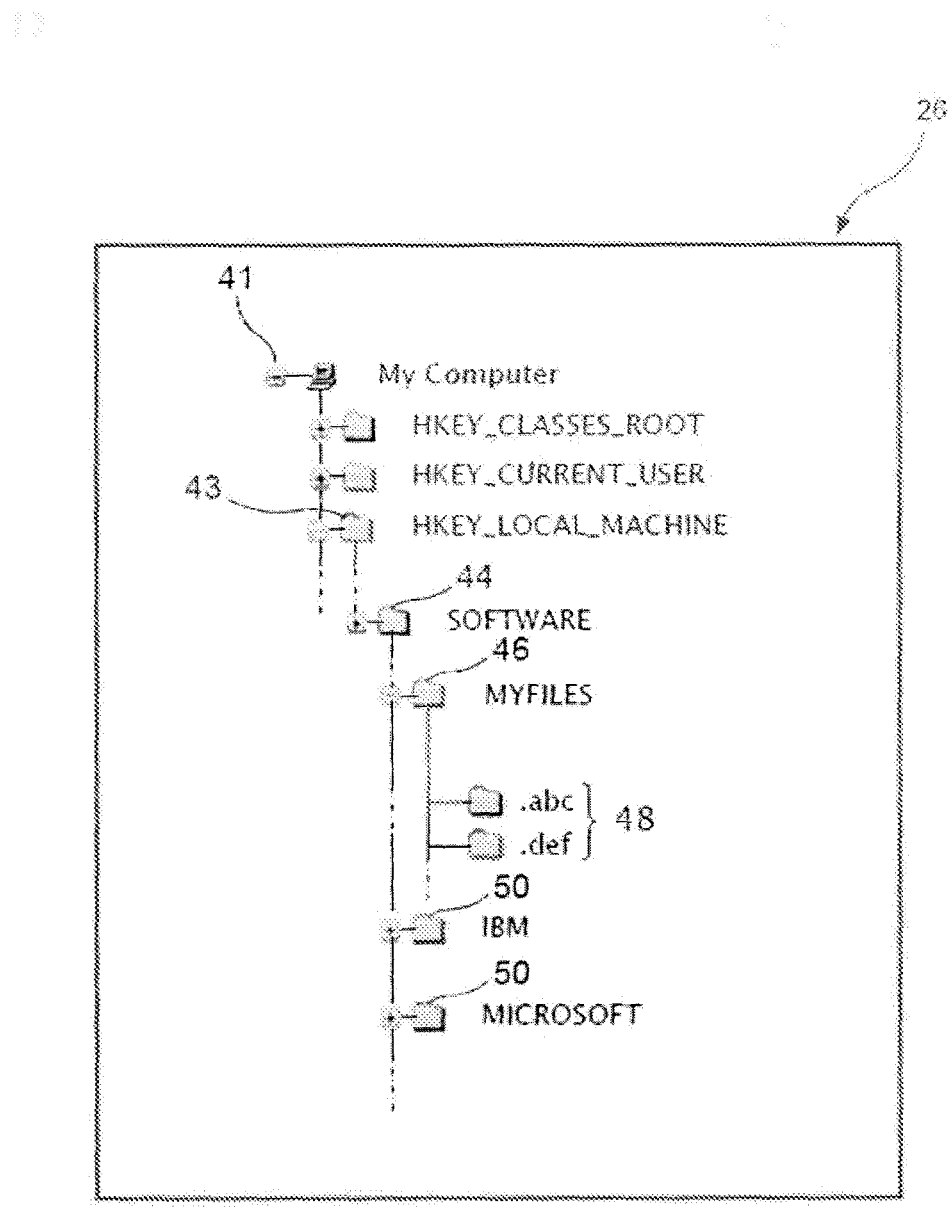
FIG. 2A is a graph that schematically shows details of a local registry database, as is known in the art.

FIG. 2A is a graph that schematically illustrates details of registry 26, in accordance with conventions of the Windows operating system. The registry comprises a tree-structured database having a root 41 and a number of predefined keys at the root, including a HKEY_LOCAL_MACHINE key 43. This latter key conventionally leads to a branch of the tree holding configuration data regarding hardware and software that are installed in computer 21. Typically, the software configuration data are stored under a software subkey 44, which itself contains subkeys such as a "MYFILES" subkey 46 and vendor subkeys 50. All of these subkeys generally contain further subkeys, such as subkeys 48 corresponding to particular file types under subkey 46, as well as values (not shown in this figure). The elements of registry 26 and their locations in the registry database are shown in FIG. 2A only by way of example. Windows imposes relatively few constraints on application developers, who may thus choose to define different keys and locations in the registry in which to store their configuration data.

Figure 2B:
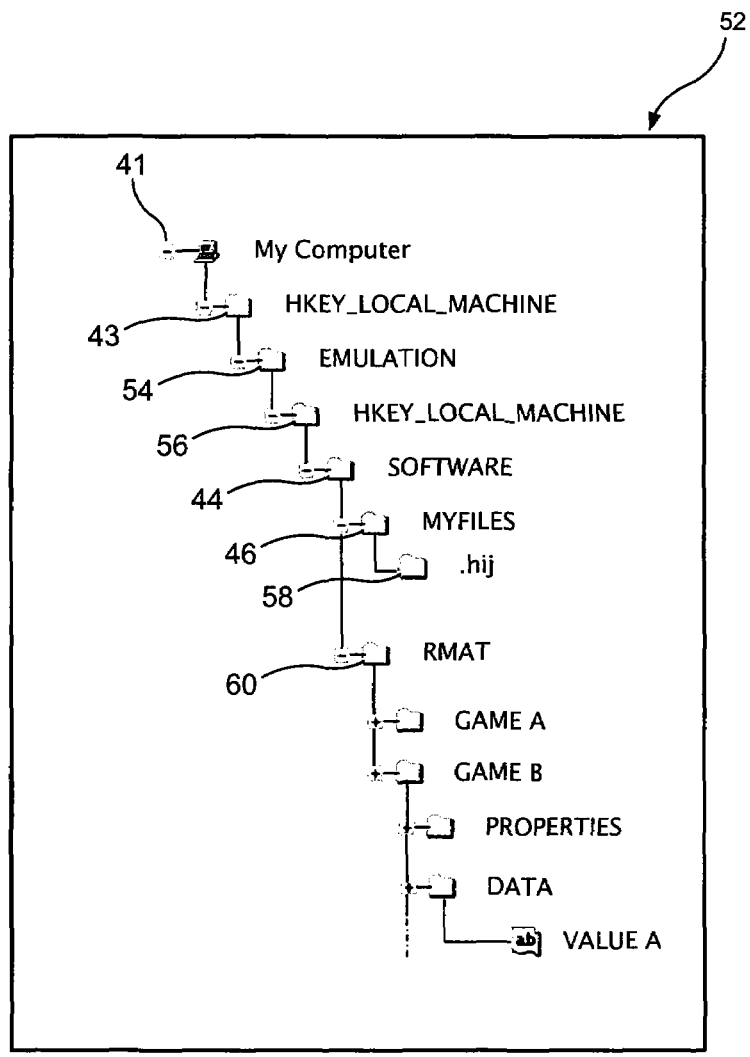
FIG. 2B is a graph that schematically shows details of an emulation registry database, in accordance with a preferred embodiment of the present invention.

FIG. 2B is a graph that schematically illustrates details of an emulation registry database 52, in accordance with a preferred embodiment of the present invention. The figure presents a hypothetical example of a database created to hold registry emulation data for two applications, "GAME A" and "GAME B," belonging to an application vendor named "RMAT." For this purpose, an emulation key 54 is preferably created under HKEY_LOCAL_MACHINE key 43, most preferably using "registry spying" procedures described hereinbelow with reference to FIG. 4. The contents of database 52 are stored in hive file 40. When the hive file is loaded, preferably using the RegLoadKey function of the above-mentioned Microsoft Platform SDK, key 54 is added to the tree of registry 26 in its designated location under HKEY_LOCAL_MACHINE key 43. Alternatively, the emulation key may be created elsewhere in the registry tree, as long as its location is such as to allow the hive file with the emulation key to be created.

Emulation key 54 contains subkeys and branches that correspond to the subkeys and branches of local registry 26. These are typically the subkeys and branches to which application 38 would write its configuration data if the application were actually installed on computer 21. Thus, database 52 comprises a second HKEY_LOCAL_MACHINE key 56 under emulation key 54, with its own software subkey 44 and MYFILE5 subkey 46 corresponding to the software and file type subkeys in local registry 26. Subkey 46 in database 52 contains a further subkey 58 corresponding to a new file type ".hij" used by the RMAT applications. Database 52 also comprises a vendor subkey 60 for RMAT, containing configuration data and values required for the vendor's games.

Figure 2C:
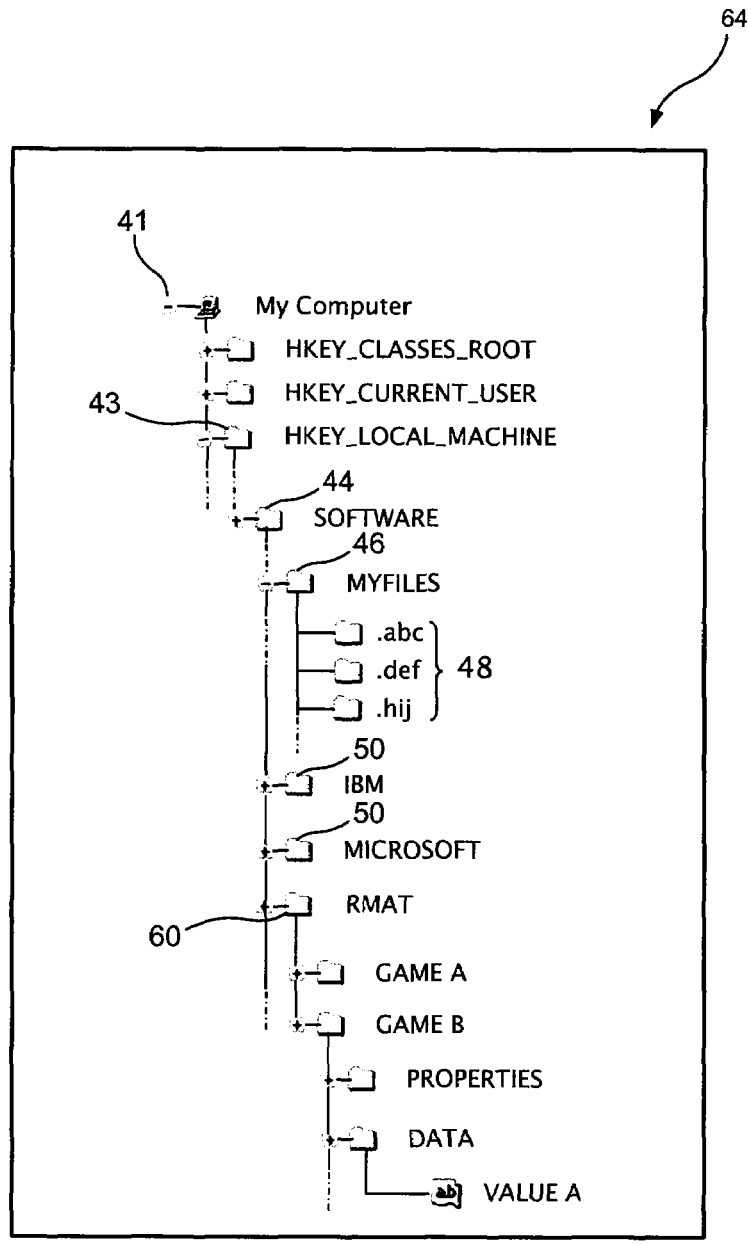
FIG. 2C is a graph that schematically shows details of a combined registry database, in accordance with a preferred embodiment of the present invention.

FIG. 2C is a graph that schematically shows details of a combined registry database 64, which is presented by a registry emulation function to application 38 running on computer 21, in accordance with a preferred embodiment of the present invention. Combined database 64 is created from local registry 26 and emulation database 52. It corresponds to the registry structure that application 38 would encounter on disk 22 if the application were installed there. Database 64, however, is a sort of virtual database, since there is nowhere that it is stored as an integrated unit in this form. Rather, the emulation function running in conjunction with the application on computer 21 provides pieces of the database dynamically, in reply to requests by the application to access the registry. The method by which the emulation database is combined with the local registry is described hereinbelow with reference to FIG. 3. The result is that the registry emulation is transparent to the application, which runs as though it were installed on the computer.

Combined database 64 includes some keys that are purely local (belonging only to registry 26), others that are used only by the registry emulation, and still others that are shared between local and emulation functions. For example, vendor subkeys 50 are pure local keys, while vendor subkey 60 is a pure emulation key on the other hand software subkey 44 and MYFILE5 subkey 46 are shared, appearing in both registry 26 and emulation database 52. When the application invokes such a shared key, the emulation process preferably refers to both the local registry and the emulation database in order to service the application. When the application changes one of the shared keys or values, the change is preferably recorded in the emulation database, without changing the local registry itself. Thus, when the application is finished running, the computer will return to its previous configuration, as given by its local registry.

Figure 3:
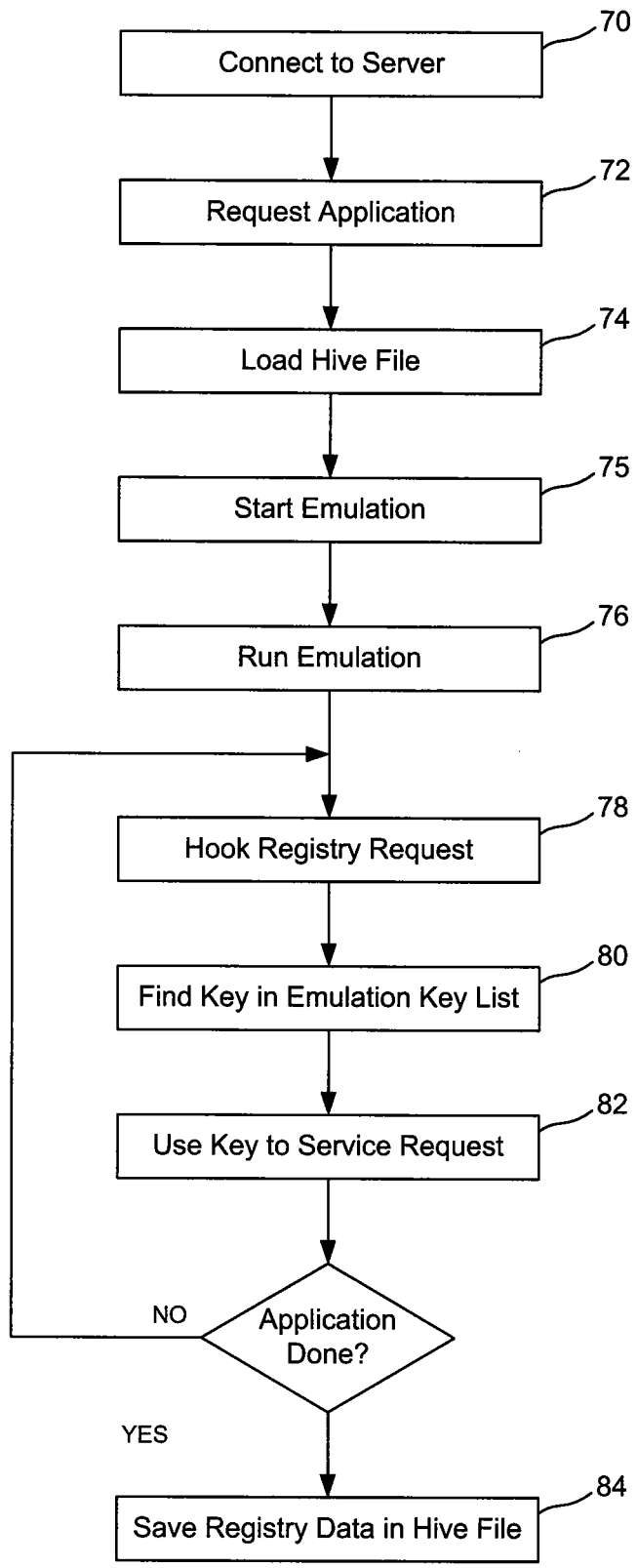
FIG. 3 is a flow chart that schematically illustrates a method for registry emulation, in accordance with a preferred embodiment of the present invention.

FIG. 3 is a flow chart that schematically illustrates a method for running an application with registry emulation, in accordance with a preferred embodiment of the present invention. At a connection step 70, computer 21 connects to server 32 and, at an application request step 72, invokes application 38. In response, the server provides the necessary application code and hive file 40. At a load step 74, the contents of the hive file (database 52) are loaded into the registry of computer 21, preferably using the above-mentioned RegLoadKey function.

Registry emulation is initiated using database 52 and registry 26, at a start emulation step 75. The emulation is carried out by a Windows Virtual Device Driver (VxD), which includes the necessary functions to intercept and service registry requests made by application 38. Methods of building and loading VxDs are known in the art of Windows programming. For example, tools and procedures for compiling, linking, loading and debugging VxDs are provided by VtoolsD (available from Compuware Numega, http://www.numega.com/). The use of these tools is described in Chapter 5 of the VtoolsD User's Guide, which is incorporated herein by reference. The VxD that is used for emulation is preferably pre-installed on disk 22 of computer 21, and is loaded dynamically at step 75. Alternatively, the VxD may be downloaded from server 32 for installation on computer 21 at this stage. Loading of the VxD is preferably accomplished by calling the appropriate Windows API or service. These APIs and services are described in MSDN publications including "Platform SDK: Win32 API" and Chapter 36 (Virtual-Device Loader) of the "Driver Development Kit," which are incorporated herein by reference. Alternatively, VtoolsD provides a utility known as VXDLOAD that can be used for this purpose. Upon completion of the emulation (at step 84, below), the VxD is preferably unloaded.

The application begins to run on computer 21, at an application running step 76. Whenever the application requests one of the registry services provided by the Windows VMM, an appropriate function of the registry emulation VxD intercepts, or "hooks" the request, at a hooking step 78. Preferably, the following services are hooked:
    RegOpenKey
    RegCloseKey
    RegQueryValue
    RegQueryValueEx
    RegCreateKey
    RegDeleteKey
    RegSetValue
    RegSetValueEx
    RegEnumKey
    RegEnumValue
    RegQueryInfoKey Any suitable tools may be used for this purpose, such as the Hook_Device_Service_C service, also provided by VtoolsD. This service enables emulation functions to monitor and replace the services of the VMM with substitute services. Details of these substitute services are described in Appendix A.

Every registry request made by the application must specify a registry key to which the request refers. To deal with these requests, the registry emulation functions build and maintain a list of all open registry keys, referred to herein as the key list. In the Windows operating system, each open key is assigned a unique handle, which is preferably used to identify the key in the list. The key list can be implemented as an array or a linked list. Preferably, the key list is maintained in memory as a binary-sorted array (sorted by the handles), so that the emulation runs efficiently and does not slow the application. A new record is added to the key list whenever RegOpenKey or RegCreateKey is called.

In addition to the handle, the following information is preferably collected and held for each key in the list:
    The path to the key.
    The number of subkeys that exist under this key in registry 26, referred to herein as the maximum key index.
    The number of values that exist under this key in registry 26, referred to herein as the maximum value index.
    A flag indicating whether or not the key exists in registry 26, preferably having the value true if the key exists only in emulation database 52 (i.e., a pure emulation key), and false if it exists in registry 26.
    An additional key handle, referred to herein as the parallel key.

Beyond the path and the handle, the other fields in the key list are useful in enhancing the efficiency and speed of the emulation functions. Not all of these fields need be used, and some may be blank. Further details regarding the use of this information are provided in Appendix A.

For each registry request received from the application, the registry emulation VxD finds the corresponding key in the key list, at a key finding step 80. Then, at a servicing step 82, the emulation provides the application with the requested service. In order to provide for emulation of all of the registry services that the application may request, the emulation VxD and key list must support the following functions:

Add a key to the list,

Remove a key from the list.

Find a key in the list and retrieve its information.

Find a key in the list and change its information.

For all of the functions except adding a key to the list, the handle of the key is preferably used as an identifier in carrying out the function_As in any case of service hooking, the emulation function returns to the application the same range of return codes as the original VMM service would. Thus, the application is substantially unaware of and unaffected by the emulation. The above-mentioned Microsoft Platform SDK documentation lists the possible return codes for each registry-related service. Appendix A provides a brief description and pseudocode listing for all of the hooked services that are provided by the registry emulation functions.

The emulation functions continue to carry out steps 78 through 82 for each registry service request that is received while the application is running. When the application is finished running, emulation registry database 52 is saved to hive file 40, including any changes made in the data while the application was running. When computer 21 again asks to run application 38, the stored data in the hive file are preferably reloaded, so that the changes made previously are restored.

Figure 4:
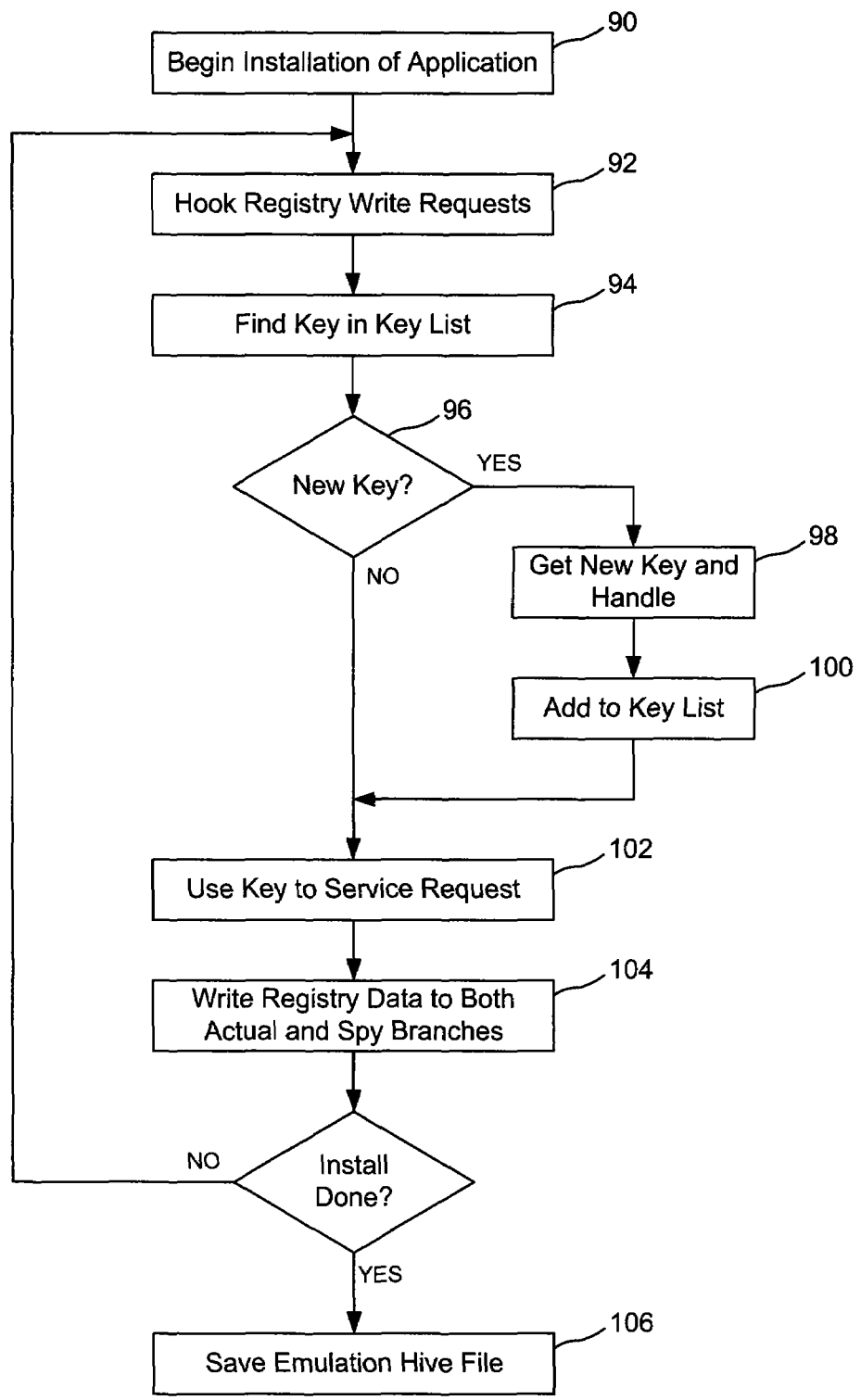
FIG. 4 is a flow chart that schematically illustrates a method for creating an emulation hive file, in accordance with a preferred embodiment of the present invention.

FIG. 4 is a flow chart that schematically illustrates a method for creating hive file 40, in accordance with a preferred embodiment of the present invention. This method is based on "spying" on a trial computer, such as computer 21, during installation of application 38 on the computer. The normal installation procedure is used while a spy process monitors information written to the registry, in order to collect the keys and values needed for inclusion in emulation registry database 52.

Installation of the application is begun at an initial step 90. During installation, the spy process intercepts all requests by the application (or by an installer utility associated with the application) to write to the registry of the computer, at a request hooking step 92. The hooking is preferably accomplished in substantially the same manner as at step 78 in the method of FIG. 3, using the above-mentioned Hook_Device_Service_C service, for example. In this case, the following VMM services must be hooked:

RegOpenKey

RegCloseKey

RegCreateKey

RegSetValue

RegSetValueEx

As an alternative to hooking these services, it is possible simply to monitor and record registry accesses by the application or its installer, using a utility such as Regmon (a shareware program available at http://www.sysinternals.com/regmon.htm). The information thus obtained can then be used to manually construct the emulation registry, using Regedit, for example.

Each of the hooked requests at step 92 includes a specification of a key, as required by the syntax of the request. The operating system responds to these requests by providing the handle corresponding to the key. Using these keys and their handles, the spy process builds a key list for the application, similar to the key list that is later used at step 80 in the emulation method of FIG. 3. Thus, each hooked request is examined, at a key finding step 94, to determine whether the key already exists in the key list. If the process finds, at a new key step 96, that the key is not yet on the list, then the key path and handle are captured, in a get key step 98. This information is added to the key list, in an add key step 100.

Using the key provided in the hooked request, the spy process services the request (taking the place of the VMM), at a request servicing step 102. Appendix B provides a brief description and pseudocode listing for each of the hooked services that is provided by the spy process. To save the registry data gathered at this stage, the process creates an emulation branch in the registry, exemplified by the branch under emulation subkey 54 in database 52. Then, at a data writing step 104, all of the registry data generated during the installation are written twice: once to the location intended by the application itself, and once to a mirror location in the emulation branch. For example, RMAT vendor key 60 will be written both to HKEY_LOCAL_MACHINE\SOFTWARE\RMAT and to HKEY_LOCAL_MACHINE\EMULATION\HKEY_LOCAL_MACHINE\SOFTWARE\RMAT. The installation thus proceeds transparently, without the application or installer being aware of the spy process going on. Once installation of the application is finished, the emulation branch of the registry is saved to hive file 40, at a file saving step 106, preferably by using the appropriate RegSaveKey command.

The software required to carry out the functions described hereinabove, such as registry emulation, creating emulation hive files, and running applications without installation, is typically conveyed to computer 21 and/or server 32 in electronic form, over network 30, for example. Alternatively, some or all of the software may be supplied on tangible media, such as CD-ROM or non-volatile memory.

Although preferred embodiments are described herein with reference to system 20, shown in FIG. 1 as a client-server system operating over network 30, the usefulness of registry emulation is in no way limited to such systems. Registry emulation may also be used locally on computer 21, for example, to run applications off a medium such as a CD-ROM while saving the time needed for installation on the computer. Running applications without installation also avoids cluttering of local registry 26 with excessive application data. Furthermore, although the embodiments described herein are based on the registry of the Windows operating system, the principles of the present invention are similarly applicable to other operating systems that use a common database to maintain consistent configuration data for different applications.

It will thus be appreciated that the preferred embodiments described above are cited by way of example, and that the present invention is not limited to what has been particularly shown and, described hereinabove. Rather, the scope of the present invention includes both combinations and subcombinations of the various features described hereinabove, as well, as variations and modifications thereof which would occur to persons skilled in the art upon reading the foregoing description and which are not disclosed in the prior art.

Appendix A - Hooked Emulation Services

This appendix provides a brief description of each of the hooked services provided by the registry emulation process of FIG. 3, followed by a pseudocode listing of the function for emulation of the service.

RegOpenKey

This service accepts the handle of an already open registry key and the path to a subkey. The service attempts to open a new key under the existing key using the given path. If successful, a new handle is assigned to the newly-opened registry key.
1. Find the key in the key list
2. If the key was not found, call the original handler; exit
3. If the information from the key list indicates that this key is a pure emulation key, use the original handler to open a new key using the given path; if successful add the new key to the key list, mark it as a pure emulation key; exit
4. Use the original handler to open the required path.
5. If successful add the new key to the list (it is not a pure emulation key); exit
6. Use the original handler to open the required path in the emulation data
7. If successful add the new key to the key list, mark it as a pure emulation key; exit
8. Return the error code from the original handler and exit

RegCloseKey

This service accepts the handle of an already-open registry key and closes it.
1. Find the key in the key list
2. If the key was not found, call the original handler; exit
3. Call the original handler to close the handle
4. Remove the key from the list

RegQueryValue

This service accepts the handle of an already-open registry key and the name of an existing subkey. It returns a string from the default value of the specified subkey.
1. Find the key in the key list
2. If the key was not found, call the original handler; exit
3. If the key is a pure emulation key, call the original handler; exit
4. Attempt to open the key in the emulation registry; the result is the emulation key
5. If unsuccessful, call the original handler; return any result from the original handler (success or failure); exit
6. Use the original handler and the emulation key to get the value from the emulation registry; if successful, return the result and exit
7. Call the original handler; return any result from the original handler (success or failure); exit

RegQueryValueEx

This service accepts the handle of an already-open registry key and the name of an existing value. It returns the type, content, and size of the value.
1. Find the key in the key list
2. If the key was not found, call the original handler: exit
3. If the key is a pure emulation key, call the original handler; exit
4. Attempt to open the key in the emulation registry, the result is the emulation key
5. If unsuccessful, call the original handler; return any result from the original handler (success or failure); exit
6. Use the original handler and the emulation key to get the value from the emulation registry; if successful, return the result and exit
7. Call the original handler; return any result from the original handler (success or failure); exit

RegCreateKey

This service accepts the handle of an already-open registry key and the path to a new subkey. It creates the new subkey.
1. Find the key in the key list
2. If the key was not found, call the original handler; exit
3. If the key is a pure emulation key, call the original handler; if successful, add the newly-created key to the key list as a pure emulation key; exit
4. Attempt to open (do not create yet) the new key in the real registry; if successful, add the new key to the list (not a pure emulation key); exit
5. Open the existing key in the emulation registry
6. If unsuccessful, create the existing key in the emulation registry
7. Create the new key in the emulation registry
6. Add the newly-created key to the key list as a pure emulation key; exit

RegSetValue

This service accepts the handle of an already-open registry key, the name of a new subkey and a string value. It creates the subkey under the existing key and sets its default value to the given string.
1. Find the key in the key list
2. If the key was not found, call the original handler; exit
3. If the key is a pure emulation key, call the original handler; exit
4. Open the path to the key in the emulation registry
5. If unsuccessful, create the existing key in the emulation registry
6. Call the original handler to set the value under the newly-opened/created key in the emulation registry
7. Return the result of the original handler and exit

RegSetValueEx

This service accepts the handle of an already-open registry key, along with the name of a value and its type, size and content It sets the value accordingly, after first creating it if necessary.
1. Find the key in the key list
2. If the key was not found, call the original handler; exit
3. If the key is a pure emulation key, call the original handler; exit
4. Open the path to the key in the emulation registry
5. If unsuccessful, create the existing key in the emulation registry
6. Call the original handler to set the value under the newly-opened/created key in the emulation registry
7. Return the result of the original handler and exit

RegEnumKey

This service accepts the handle of an already-open registry key and an enumeration index, and returns an enumeration of the subkeys under the existing key.
1. Find the key in the key list
2. If the key was not found, call the original handler; exit
3. If the key is a pure emulation key, call the original handler; exit
4. If the key does not have a parallel key in the list, skip to step 9 below
5. Call the original handler to perform the enumeration; if successful, return the result and exit
6. If the original handler failed with any error code other than ERROR_NO_MORE_ITEMS, return the error code and exit
7. Calculate a new enumeration index by subtracting the enumeration index from the maximum key index 8. Call the original handler with the parallel key and the new enumeration index; return the result and exit
9. Call the original handler to perform the enumeration; if successful, return the result and exit
10. If the original handler failed with any error code other than ERROR_NO_MORE_ITEMS, return the error code and exit
11. Open the path to the key in the emulation registry
12. If unsuccessful, exit with the code ERROR_NO_MORE_ITEMS
13. The key opened in step 11 is now the parallel key, store it in the key list
14. The enumeration index is now the maximum key index; store it in the key list
15. Call the original handler with the parallel key and enumeration index 0; return the result and exit RegEnumValue This service accepts the handle of an already-open registry key and an enumeration index, and returns an enumeration of the values under the existing key.
1. Find the key in the key list
2. If the key was not found, call the original handler; exit
3. If the key is a pure emulation key, call the original handler; exit
4. If the key does not have a parallel key in the list, skip to step 9 below
5. Call the original handler to perform the enumeration; if successful, return the result and exit
6. If the original handler failed with any error code other than ERROR_NO_MORE_ITEMS, return the error code and exit
7. Calculate a new enumeration index by subtracting the enumeration index from the maximum value index
8. Call the original handler with the parallel key and the new enumeration index; return the result and exit
9. Call the original handler to perform the enumeration; if successful, return the result and exit
10. If the original handler failed with any error code other than ERROR_NO_MORE_ITEMS, return the error code and exit
11. Open the path to the key in the emulation registry
12. If unsuccessful, exit with the code ERROR_NO_MORE_ITEMS
13. The key opened in line 11 is now the parallel key; store it in the key list
14. The enumeration index is now the maximum value index; store it in the key list
15. Call the original handler with the parallel key and enumeration index 0; return the result and exit RegQueryInfoKey This service accepts the handle of an already-open registry key and an enumeration index, and returns information about the key.
1. Find the key in the key list
2. If the key was not found, call the original handler; exit
3. If the key is a pure emulation key, call the original handler; exit
4. Call the original handler; if unsuccessful, return the error code and exit
5. Open the path to the key in the emulation registry
6. If unsuccessful, return the results of the call in step 4; exit
7. Use the key opened in step 5, and call the original handler
8. Calculate the combined results for the following parameters: 1pcSubKeys, 1pcchMaxSubKey, 1pcValues, 1pcchMaxValueName, 1pcbMaxValueData (as specified in the Platform SDK documentation); for each parameter in the list calculate the maximum of the two results (from steps 4 and 7)
9. Close the key opened in step 5
10. Return the combined results (as calculated in line 8) and exit Appendix B—Hoofed "Spy" Services This appendix provides a brief description of each of the hooked services provided by the spy process of FIG. 4, followed by a pseudocode listing of the function for emulation of the service. Although the spy process hooks some of the same VMM services as the emulation process, it responds to them differently, as detailed below.

RegOpenKey

This service accepts the handle of an already-open registry key and the path to a subkey. The service attempts to open a new key under the existing key using the given path. If successful, a new handle is assigned to the newly open registry key.
1. Find the key in the key list
2. If the key was not found, call the original handler; exit
3. Use the original handler to open the required path
4. If successful, add the new key to the list
5. Return the error code from the original handler and exit RegCloseKey This service accepts the handle" of an already-open registry key and closes it.
1. Find the key in the key list
2. If the key was not found, call the original handler; exit
3. Call the original handler to close the handle
4. Remove the key from the list RegCreateKey This service accepts the handle of an already-open registry key and the path, to a new subkey. It creates the new subkey.
1. Find the key in the key list
2. If the key was not found, call the original handler; exit
3. Call the original handler to create the new key
4. Add the newly created key to the key list
5. Exit RegSetValue This service accepts the handle of an already-open registry key, the name of a new subkey and a string value. It creates the subkey under "the- existing key and sets its default value to the given string.
1. Find the key in the key list
2. If the key was not found, call the original handler; exit
3. Open the path to the key in the emulation branch
4. If unsuccessful, create the existing key in the emulation branch
5. Call the original handler to set the value under the newly-opened/created key in the emulation branch
6. Call the original handler again to set the value, this time under the original existing key,
7. Return the result of the call in step 6 and exit RegSetValueEx This service accepts the handle of an already-open registry key, the name of a value, and the type, size and the content of the value. It sets the value accordingly, creating it if necessary.
1. Find the key in the key list
2. If the key was not found, call the original handler; exit
3. Open the path to the key in the emulation branch
4. If unsuccessful, create the existing key in the emulation branch
5. Call the original handler to set the value under the newly-opened/created key in the emulation branch
6. Call the original handler again to set the value, this time under the original existing key
7. Return the result of the call in step 6 and exit

What is claimed is:

1. A method for servicing requests of an application running on a computer that uses an operating system and a local database to maintain configuration data to be accessed by the application running on the computer, the method comprising:
   generating one or more data repositories containing further configuration data for the application;
   virtually combining the data repositories with the local database to create a virtual combined database corresponding to a database structure that the application would encounter if the application were installed on the computer;
   intercepting selected requests of the application; and
   servicing each selected request using either configuration data maintained in the local database or the further configuration data stored in the virtual combined database, whereby access to the further configuration data is controlled in a manner transparent to the application.

2. The method of claim 1 wherein the virtually combining step further comprises storing the one or more data repositories in one of (i) an alternate file or (ii) an alternate path in the local database.

3. The method of claim 1 wherein the servicing step further comprises:
   servicing a write request with further configuration data; and
   determining whether to write the further configuration data to the local database or to the one or more data repositories in the virtually combined database.

4. The method of claim 1 where the servicing step further comprises:
   servicing a read request for configuration data; and
   deciding whether to read the data from the local database or from the one or more data repositories in the virtually combined database.

5. A method for intercepting and servicing requests of an application running on a computer that uses an operating system and a local database to maintain configuration data to be accessed by the applications, without installation of the application on the computer, which configuration data would normally include further configuration data of the application generated during at least one of the installation or operation of the application on the computer, the method comprising:
   providing one or more data repositories containing the further configuration data
   intercepting selected requests of the application;
   identifying the selected requests as a request for one or more configuration elements from the further configuration data;
   virtually combining the one or more configuration elements from the further configuration data with a configuration element from the local database to create a virtual set of configuration elements that the application would encounter if the application were actually installed; and
   servicing the selected requests of the application using the virtual set of configuration elements, whereby access to the configuration elements is controlled in a manner transparent to the application.

6. The method of claim 5 further comprising storing the one or more data repositories in one of (i) an alternate file, or (ii) an alternate path in the local database.

7. A method for servicing requests of an application running on a computer that uses an operating system and a local database to maintain configuration data to be accessed by programs running on the computer, the method comprising:
   generating one or more data repositories containing further configuration data by monitoring registry access requests from the application;
   servicing selected requests of the application for one or more configuration elements from the further configuration data;
   combining the requested one or more configuration elements from the further configuration data with the local database to create a virtual combined database corresponding to a database structure the application would ordinarily encounter when installed on the computer; and
   servicing the selected requests of the software application using the further configuration data so as to retrieve the further configuration data in a transparent manner while running the application on the computer.

8. The method of claim 7 further comprising storing the one or more data repositories in one of (i) an alternate file, or (ii) an alternate path in the local database.

* * * * *